Figure 1:
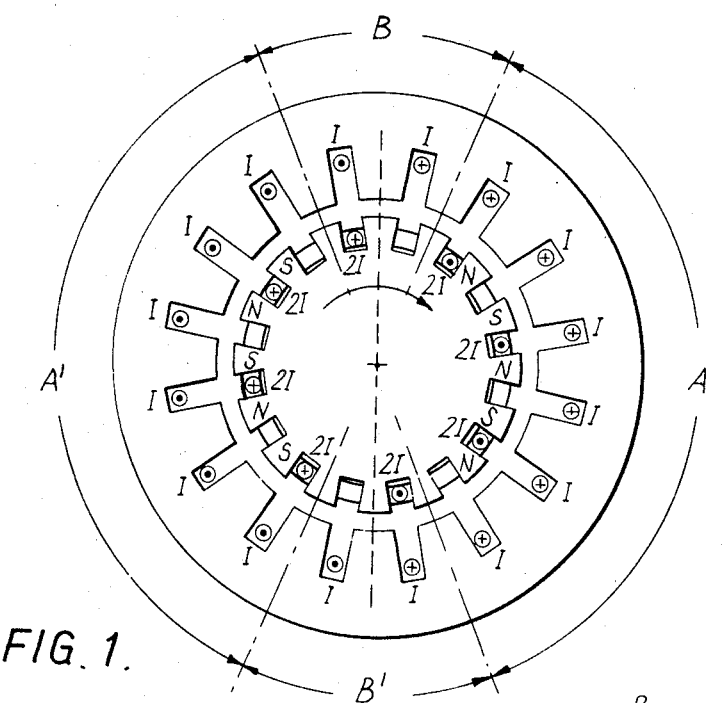

United States Patent

[11] 3,594,595

| [72] | Inventors | Frederic Calland Williams<br>Prestbury;<br>Graham Wilson McLean, Stockport, both<br>of, England |
|---|---|---|
| [21] | Appl. No. | 862,409 |
| [22] | Filed | Sept. 30, 1969 |
| [45] | Patented | July 20, 1971 |
| [73] | Assignee | National Research Development<br>Corporation<br>London, England |
| [32] | Priority | Oct. 4, 1968 |
| [33] | | Great Britain |
| [31] | | 47,144/68 |
| | | Continuation-in-part of application Ser. No.<br>670,049, Sept. 25, 1967. |

[54] ALTERNATING CURRENT GENERATORS
11 Claims, 21 Drawing Figs.

[52] U.S. Cl. .................................................... 310/168,-
    310/182;201;207
[51] Int. Cl. .................................................... H02k 17/42
[50] Field of Search ............................................ 310/168,
    170, 159, 174, 169, 177, 182, 190, 211, 197, 201,
    206, 207, 202, 203, 171

[56] References Cited
UNITED STATES PATENTS

| 1,417,913 | 5/1922 | Heyland | 310/169 |
| 1,642,041 | 9/1927 | Nyman | 310/169 |
| 1,838,010 | 12/1931 | Stocker | 310/169 |
| 1,867,328 | 7/1932 | Rienks | 310/202 |
| 1,945,028 | 1/1934 | D'Almaine | 310/211 |
| 2,253,966 | 8/1941 | Baumann | 310/169 |
| 2,769,953 | 11/1956 | Schwan | 310/168 |
| 3,140,413 | 7/1964 | Terry | 310/168 |
| 3,201,627 | 8/1965 | Harrington | 310/206 |
| 3,290,526 | 12/1966 | Wren | 310/201 |

Primary Examiner—Milton O. Hirshfield
Assistant Examiner—R. Skudy
Attorney—Cushman, Darby and Cushman ABSTRACT: An inductor alternator the stator member of which carries a DC excitation winding and an output winding, which may be multiphase, and a rotor member carrying a short-circuited winding. The short-circuited winding may be a squirrel cage or may comprise conductor bars connected in series with each other between end rings or else may be connected to form short-circuited coils. The action of the machine is that circulating currents are generated in the rotor winding as the rotor rotates the direction of these currents reversing over pole pitches of the excitation winding and the multipole field so generated causes alternating currents to be generated in the output winding.

FIG. 11.
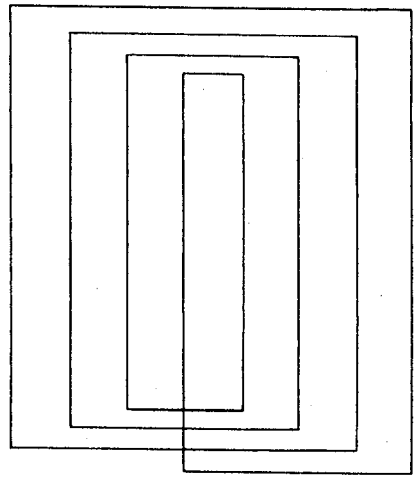
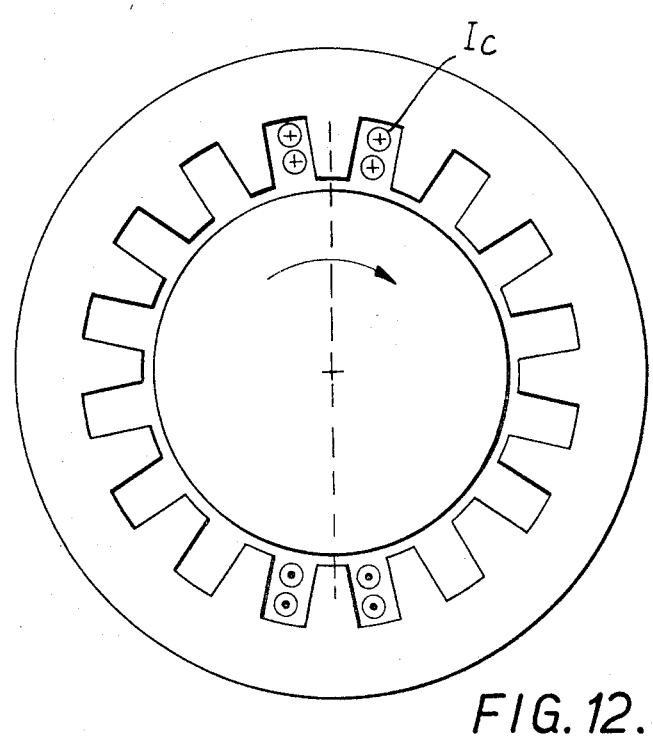
FIG. 12.

ALTERNATING CURRENT GENERATORS

This invention relates to alternating current generators and is concerned with inductor alternators, and it is a continuation-in-part application of copending U.S. Pat. application Ser. No. 670,049 filed Sept. 25, 1967.

In the conventional kind of alternating current generator the rotor is supplied with a direct current excitation which produces a magnetic field having an even number of north and south poles alternately in sequence in the airgap between the rotor and the stator, which magnetic field induces single-phase or polyphase voltages in appropriately disposed coils on the stator structure.

The main disadvantages of this type of generator are that current must be supplied to the rotor through slip rings and the current so supplied is such as to require multiturn coils on the rotor to set up the required magnetic field. The various turns must be insulated from each other, using up valuable winding space and the rotor structure is difficult to cool since many of the turns are buried within the coil. It is therefore not unusual for rotor heating in such alternators to be a limiting factor on available output.

In another type of alternator, the inductor alternator, the DC energized excitation winding and the single or poly phase output winding from which the alternating current output is taken are both accommodated on the stator. The rotor has no windings but has a number of salient poles well separated from each other so that the reluctance of the magnetic path linking the excitation winding on the stator with the output winding on the stator varies as the rotor rotates.

An advantage of this type of machine is that there is no electrical connection to the rotor and relatively little heat dissipation in it. A disadvantage is that individual portions of the stator iron structure carry flux in one direction only and the magnetic material of the stator is therefore inefficiently employed. Inductor type of alternators are therefore usually larger for a given output than those having excited rotors.

It is an object of the present invention to provide an alternator having no external electrical connection to the rotor but which causes the magnetic material of the stator to carry flux alternately in opposite directions and thereby be more efficiently used.

According to the present invention an inductor alternator comprises a stator member carrying an excitation winding and a rotor member carrying a short-circuited winding, energization of the excitation winding generating a magnetic field which causes currents to circulate in the rotor winding as the rotor rotates, the direction of the circulating currents reversing at positions spaced apart circumferentially round the airgap and the circulating currents in the rotor winding generating a multipole magnetic field in the airgap in each arc between the said positions, and an output winding on the stator member energized by the effect of rotation of the multipole magnetic field due to the rotor.

In carrying out the invention the rotor winding may comprise a plurality of conductor bars spaced apart around the periphery of the rotor. In one arrangement the bars are connected to end rings as in a squirrel cage winding. In another arrangement groups of conductor bars are connected in series between end rings. In yet another arrangement groups of conductor bars are connected together to form short-circuited coils.

The stator output windings may be single phase or multiphase as desired.

The excitation winding may be modified in the region of current reversal in the rotor winding to assist in such reversal.

Figure 2:
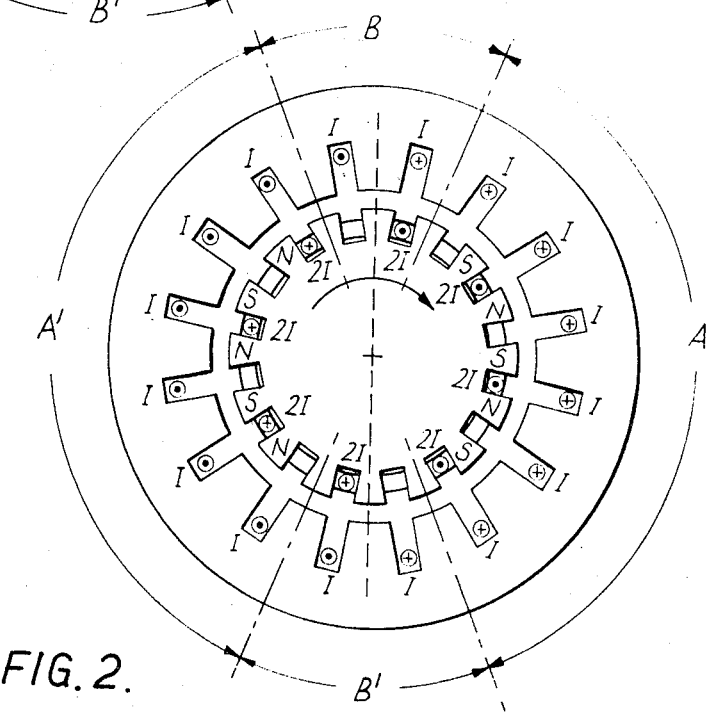
Figure 3:
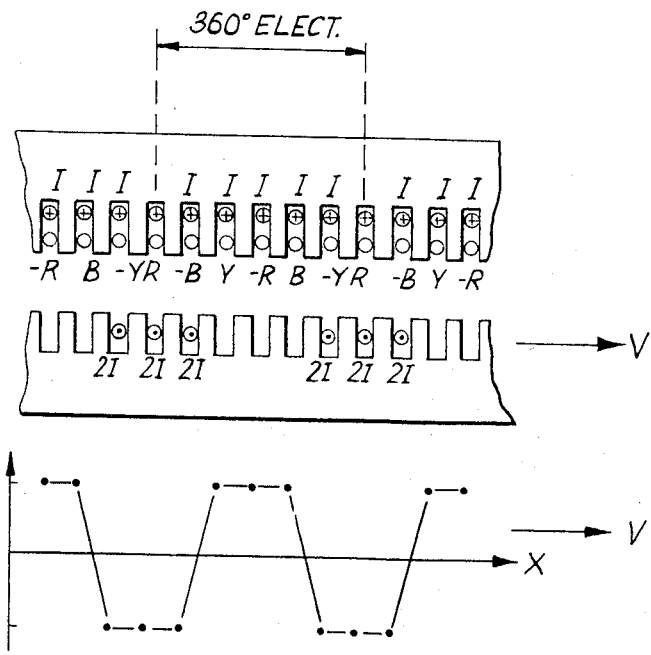
Figure 4:
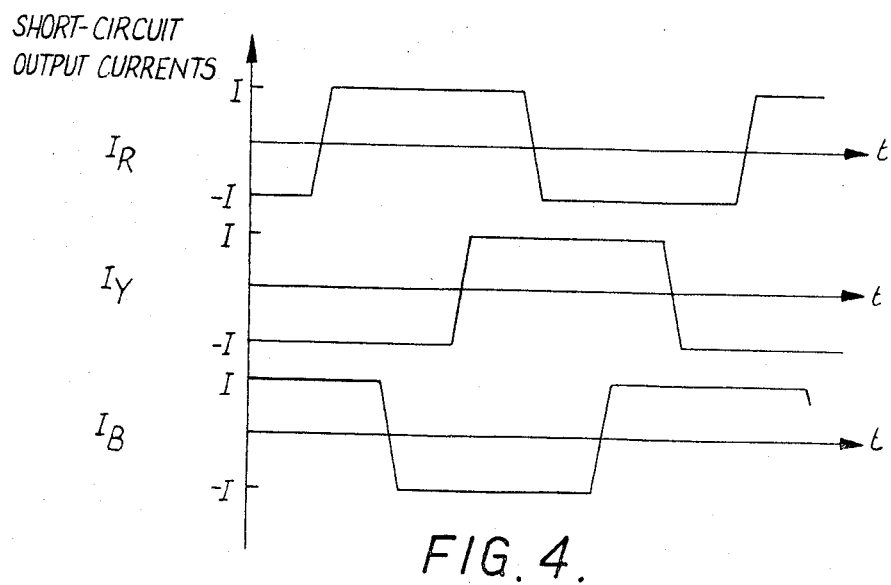
Figure 5:
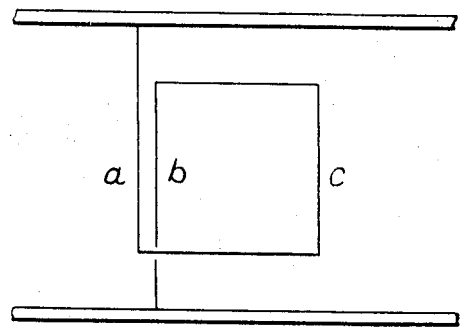
Figure 6:
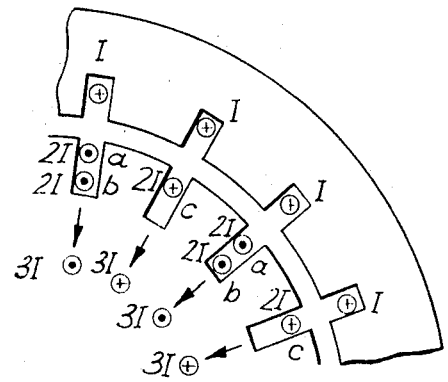
Figure 7:
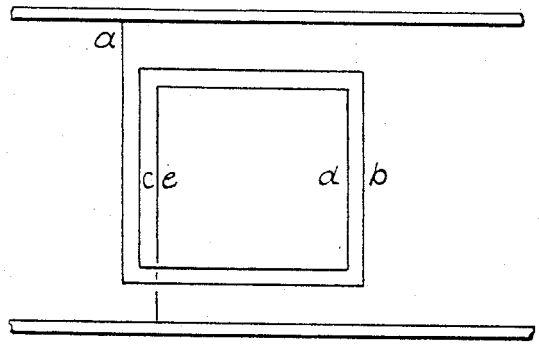
Figure 8:
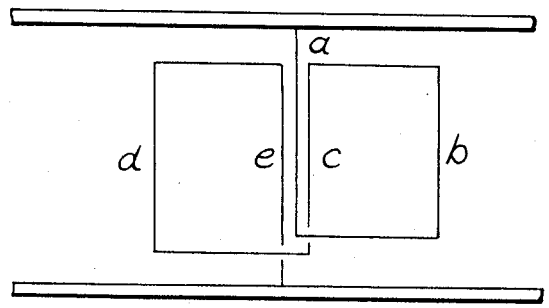
Figure 9:
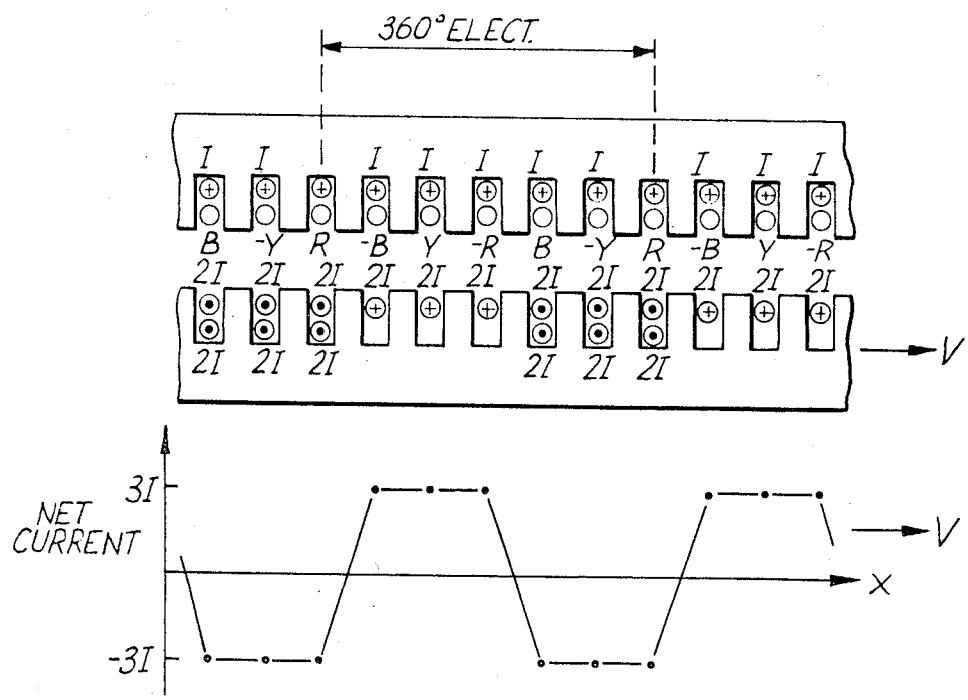
Figure 10:
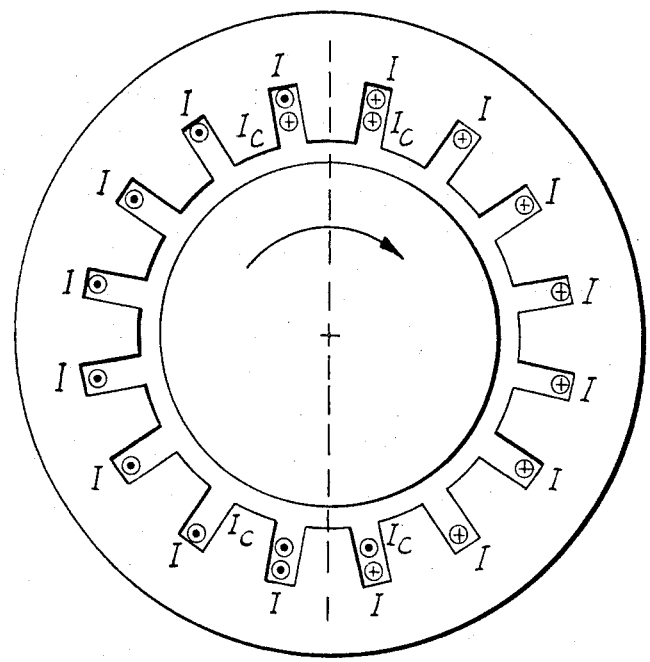
Figure 13:
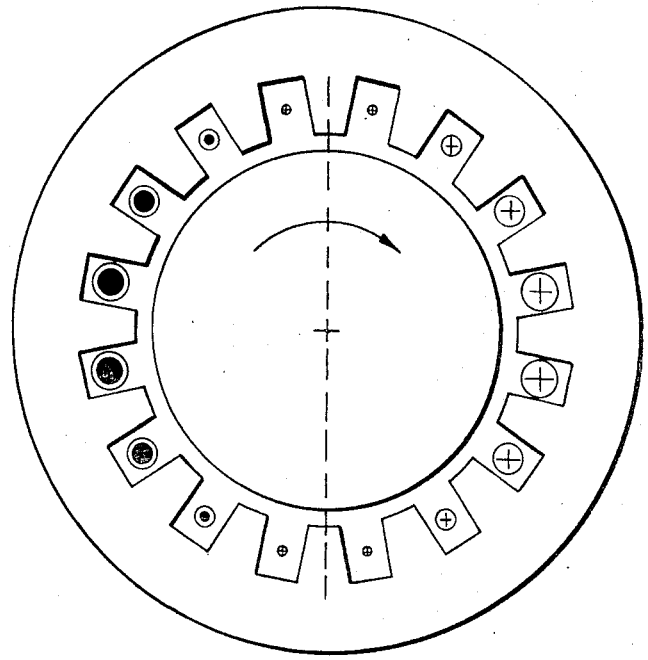
Figure 14:
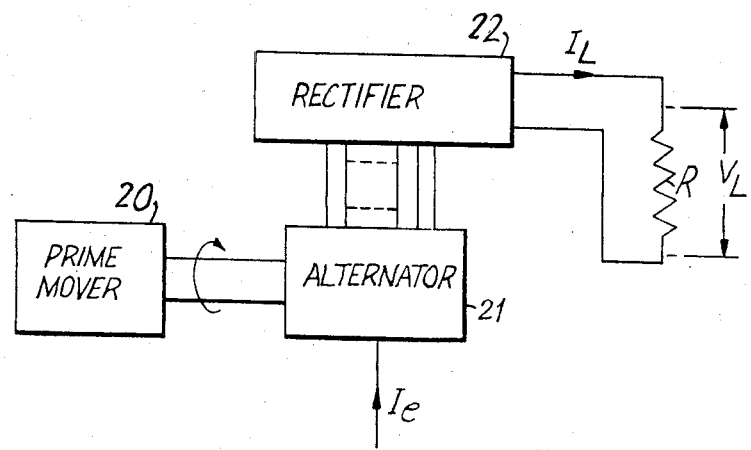
Figure 15:
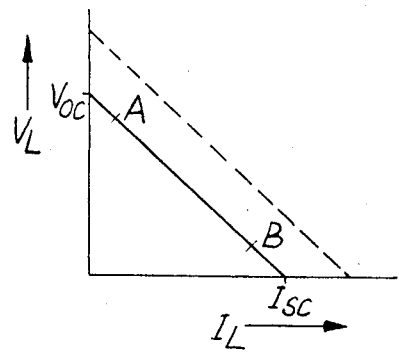
Figure 16:
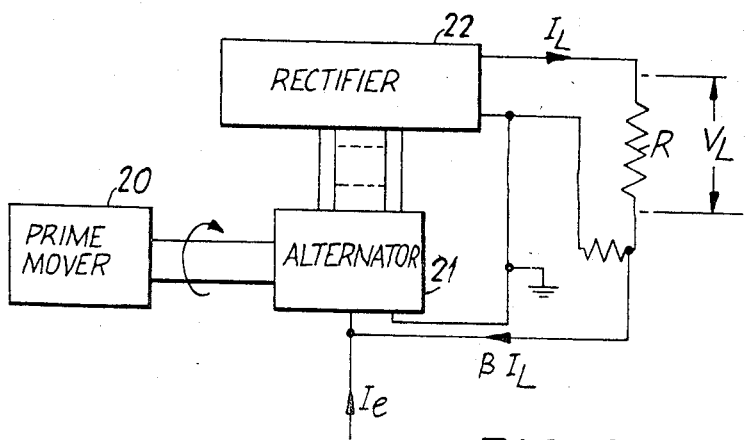

In order that the invention may be more fully understood reference will now be made to the accompanying drawings in which:

FIG. 1 and FIG. 2 illustrate an alternator embodying the invention with the rotor in two different positions, FIG. 3 illustrates in opened-out form a section of a winding suitable for three-phase generation, FIG. 4 illustrates the short circuit output currents in the output windings of the machine of FIG. 3, FIG. 5 illustrates one form of multiconductor rotor winding in opened-out view, FIG. 6 illustrates the winding of FIG. 5 in section, FIG. 7 and FIG. 8 illustrate further alternative arrangements of multiconductor rotor windings, FIG. 9 illustrates another arrangement for a three-phase output and FIG. 10 illustrates an arrangement for assisting in current reversal in the rotor windings, FIG. 11 illustrates a further alternative arrangement of multiconductor rotor windings, FIG. 12 illustrates a stator excitation winding, FIG. 13 illustrates a stator excitation winding for progressive commutation FIG. 14 illustrates in block diagrammatic form an arrangement incorporating an alternator for generating direct current, FIG. 15 is a graph of the relationship between low voltage and low current for the arrangement illustrated in FIG. 14, FIG. 16 illustrates a modification of the arrangement illustrated in FIG. 14

Figure 17:
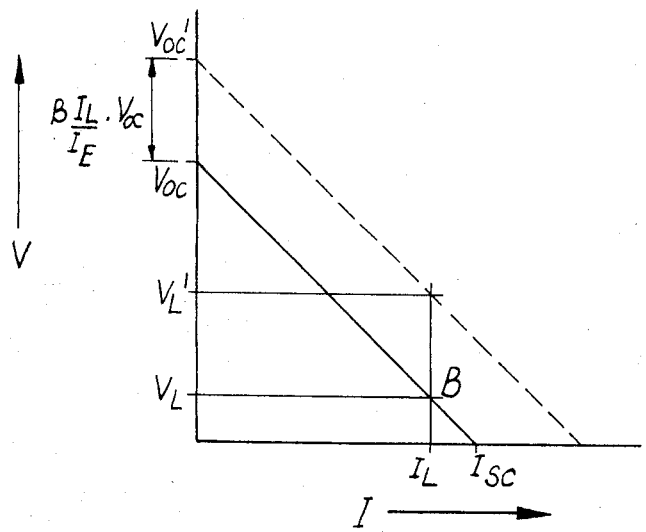
Figure 18:
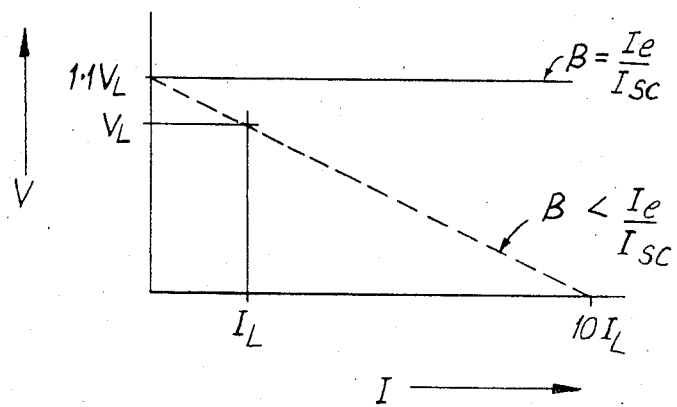
Figure 19:
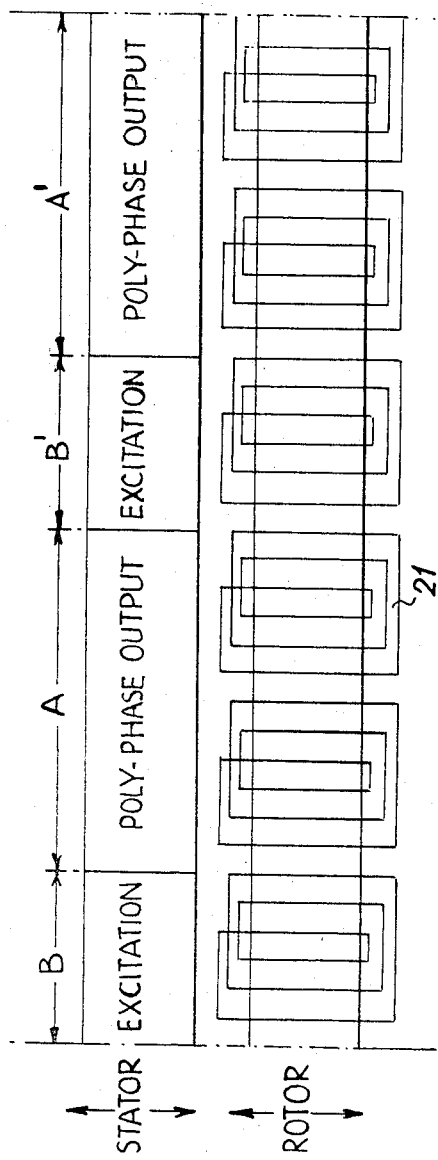
Figure 20:
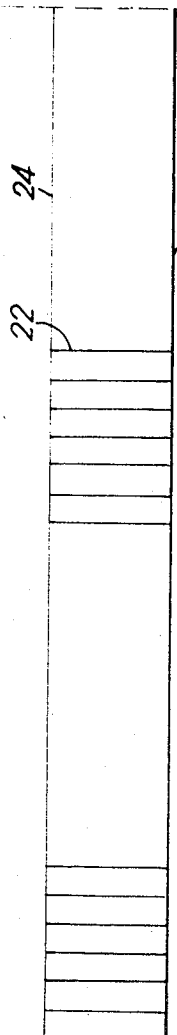
Figure 21:
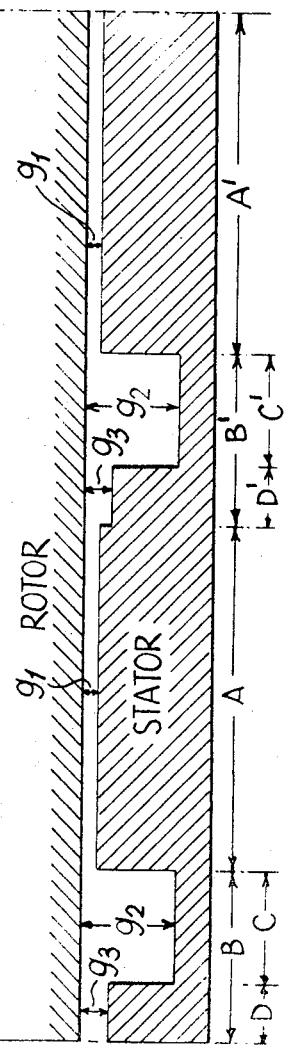

FIG. 17 and FIG. 18 are graphs illustrating relationship between voltage and current for the arrangement of FIG. 16, and, FIGS. 19, 20 and 21 illustrate in opened-out views aligned with each other a modification of the machine illustrated in FIG. 11 and FIG. 12.

The new machine is shown in simple form in FIG. 1. It comprises a stator and rotor each having 16 slots. The DC excitation winding is accommodated in the bottoms of the stator slots and each slot carries a steady DC current I. All the currents on the right of the vertical axis are directed into the paper and all those to the left out of the paper. This configuration of current can readily be set up using either a concentric or a fully pitched winding. The remainder of the stator slot space accommodates the output winding, but this is omitted from FIG. 1 in the interests of clarity. The rotor is a conventional squirrel cage as normally used with induction motors except that rotor bars are placed in alternate slots, leaving the intermediate slots empty. The ends of the rotor bars are joined by end rings 3 in the normal manner. By considering the total ampere-turns on rotor and stator to the right of the vertical axis it may be seen that each rotor bar must carry a current approximating to 2I in the direction indicated, otherwise very large flux densities would occur across the small airgap at the top and bottom of the structure. If now over the sector A of the machine the net effect of rotor and stator currents is considered, it may be seen to produce alternating north and south poles on the rotor as shown in the figure. These poles have a separation appropriate to a 16-pole conventionally excited alternator. In the corresponding sector A' on the left-hand side of the machine a similar configuration of rotor poles exists, again with separation appropriate to a 16-pole machine, but if sector A is regarded as setting up a standard 16-pole arrangement then if this is continued into sector A' it would show north poles where in fact sector A' shows south poles, and vice versa.

FIG. 2 shows the same machine after the rotor has rotated through one slot pitch, and it may be seen that all the north poles and all the south poles in sectors A and A' have moved forward by one slot pitch. Thus conditions in the sector A are very similar to what they would be in the corresponding sector of a conventional 16-pole alternator. The same may also be said of sector A' considered alone, but the conventional alternator with which it is compared must have north poles where the conventional alternator with which sector A was compared had south poles. Since conditions in sector A are comparable with those in a conventional machine, it follows that output windings such as might be used in a conventional alternator can be placed in the tops of the stator slots and such windings will supply alternating current of frequency appropriate to a 16-pole conventional machine. In the simple case, shown, output coils surrounding individual stator teeth will be fully pitched on 16 poles, and such coils could be used to supply single-phase output. A similar set of output coils surrounding the teeth in sector A' would supply current of equal phase and frequency and can, therefore, be connected in series with the coils in sector A. The appropriate sense of connection will be opposite from what it would have been in a conventional alternator.

It will be observed in FIG. 1 that as each rotor conductor crosses the vertical axis the current in it reverses in direction. Whilst this reversal is taking place the configuration of magnetic field in the airgap bears little relation to the configuration of airgap field in a conventional machine, and for this reason output coils are excluded from this region. This region is, in fact, set aside for the purpose of "commutating" the current in the rotor bars in much the same way as in DC machines the interpole arc is set aside for commutating the rotor windings. In the regions B and B', commutation of the rotor currents is caused by the rotor bars passing through a region of strong DC field set up by the stator excitation and not fully cancelled by the currents in the rotor bars. Fairly high fields are necessary since the current is commutating quickly and the rotor bars have considerable inductance due to their being embedded in slots. In the regions of A and A', however, the rotor currents remain substantially constant and are maintained by the voltage induced in the rotor bars passing through a small DC field in this region. The required DC field is small because the induced voltage is required only to overcome the resistance drop in the bars, which can be kept very small by using thick conductors. The DC flux density in the region B required for commutation need not exceed the 16-pole flux density set up in the region of A and A', and the DC flux density in the region A need not exceed 10 percent of the 16-pole flux density. Both the "commutating" DC field in regions B and B' and the "maintaining" DC field in regions A and A' are self-adjusting to appropriate values, and no additional excitation is needed to provide them. They are set up by small departures of rotor bar current from the ideal value 2I. Furthermore, "commutation" of the rotor current can be substantially complete in less than one-eighth of a revolution so that the active sectors A and A' can extend over a total arc in excess of three-fourths of the periphery. Because the DC flux density in the arcs A and A' is small compared with the 16-pole flux density, the stator iron can be used very efficiently without saturation occurring, and it will be apparent from comparison of FIGS. 1 and 2 that the stator iron is subjected to an alternating as distinct from a pulsating flux density. Furthermore, since the rotor conductors are simply bars in slots, the packing factor of the rotor winding is very high, thereby reducing rotor dissipation, and since these bars are directly connected to end rings which are readily cooled such rotor dissipation as does occur can be accommodated without undue temperature rise.

The simple single-phase machine of FIG. 1 can be converted to a polyphase machine by increasing the number of rotor and stator slots; e.g. a three-phase machine may be made by increasing the number of slots on rotor and stator to 48. A section of such a machine corresponding with a portion of sector A is shown in FIG. 3. Each stator slot again carries a DC current I at the bottom of the slot and a conventional three-phase, one slot/pole/phase fully pitched winding in the tops of the slots. The rotor bars are placed in batches of three in adjacent slots with three slots empty between each batch of three filled slots. By the same reasoning as before, each rotor bar must carry a current 2I in the direction indicated, and the net effect of rotor current and stator DC current is as shown in the graph below the structural diagram. Once again a conventional 16-pole excitation current travelling at rotor speed is set up which will induce three-phase currents in the output windings, and it may be noted that if the machine is short circuited and the airgap is very small the magnitudes of the red, blue and yellow currents with the rotor in the position shown must each be of magnitude approximating to I since then there will nowhere be any net ampere-turns acting on the airgap. By considering the effect of moving the rotor to the right one tooth pitch at a time it may be seen that three-phase short circuit currents of the form shown in FIG. 4 will be produced. When load resistance is introduced in place of the short circuit, the output current will fall below I in order to provide a net ampere-turn to produce the gap flux necessary to produce the required output voltage. In an alternative version of a three-phase machine, the number of stator slots may be increased to 48 whilst leaving the rotor slot number at 16. When this is done the effect approximates to that of a salient pole as distinct from a 'distributed winding' alternator.

The main disadvantage of machines of this simple type is that the output current per slot cannot exceed the excitation current per slot so that the available stator winding space must be divided equally between excitation and output windings. Furthermore, although the rotor bars carry a current 2I, the effective excitation current is only I; thus both rotor and stator losses will be greater than in a conventional alternator. This disadvantage can be largely overcome by replacing each rotor bar by a rotor winding of the form shown in FIG. 5. FIG. 6 shows a portion of a generator lying within the sector A marked in FIG. 1 fitted with a rotor winding of this kind. The letters $a$, $b$ and $c$ in FIG. 5 correspond with letters $a$, $b$ and $c$ in FIG. 6. Thus the conductors $a$ and $b$ of FIG. 6 lie in the slot previously containing the single conductor, and the conductor $c$ of FIG. 6 lies in the previously empty slot. Since again the total ampere conductors on the right of the vertical axis must be substantially zero, the current in each rotor bar must again be 2 I and must be directed as indicated in FIG. 6 and it may be seen that the net excitation current provided by rotor and stator currents acting together now alternates from slot to slot being 3I directed out of the paper and 3I directed into the paper as indicated. Again, if output windings are fitted in the stator slots, the short circuit current in these windings will approximate to 3I per slot and a relatively large proportion of each stator slot may therefore be allocated to the output winding. Furthermore, the effective excitation of 3I per rotor slot is now obtained with a maximum rotor slot current of 4I so that the rotor conductors are more efficiently employed.

The rotor winding of FIG. 6 may be regarded as being made up of a bar $a$ which makes a transit across the rotor length connected in series with a coil made up of the bars $b$ and $c$ which surrounds a portion of the rotor appropriate to a 16-pole excitation coil. The coil made up of the bars $b$ and $c$ cannot contribute to cancellation of the stator excitation ampere conductors when it is situated wholly within the sector A of FIG. 1. The sole contribution to such cancellation may be regarded as coming from the conductor $a$. The portions $b$ and $c$ are chosen to emphasize the 16-pole contribution. It follows that many other configurations of rotor winding are possible. Two other examples are shown in FIGS. 7 and 8. In FIG. 7 bar $a$ is connected in series with a two-turn coil made up of bars $b$, $c$, $d$ and $e$. This configuration can be accommodated in the slots of the generator illustrated in FIG. 1 in precisely the same way as in the configuration of FIG. 6. In FIG. 8 the bar $a$ is connected in series with a one-turn coil made up of bars $b$ and $c$ which is located at the right-hand side of bar $a$ and also in series with the single-turn coil made up of the bars $d$ and $e$ disposed to the left of the bar $a$. In this case the conductors $a$, $c$ and $e$ would lie in the slot in FIG. 1 previously containing a single bar. The conductor $b$ would lie in the vacant slot to the right of that slot and the conductor $d$ would lie in the vacant slot to the left of that slot. With any of these rotor winding configurations polyphase versions may be derived from the single-phase version exactly as in the case of the single-bar rotor.

FIG. 9 shows a section of a three-phase 48-slot machine using the rotor configuration of FIG. 5.

Although for convenience the machine has been described throughout as having two-pole excitation and 16-pole output, it will be appreciated that this is by way of example only. By increasing the number of rotor and stator slots in FIG. 1 the number of effective rotor poles can be increased, and there is no reason why four-pole excitation should not replace the two-pole excitation illustrated. There would then be four commutating sections alternating with four active sections. It is, however, an advantage to make the rotor pole number large compared with the excitation pole number since this has the effect of reducing the arc such as B which needs to be set aside for commutation. It will further be understood that rotor and stator slot numbers need not be equal nor need the polyphase version have three phases. By suitable choice of stator slots, polyphase outputs of any required number can be obtained.

In DC machines it is common practice to provide additional interpole windings on the stator to assist in the commutation of the rotor currents. Additional windings may also be employed in the arcs B and B' to assist in the commutation of the rotor currents. For example, commutation can be speeded up by the additional excitation winding shown in FIG. 10 which carries current $I_c$.

If the rotor winding group shown in FIG. 7 is modified to include more than two turns in the effective coil $a, b, c, d, e$, it is found that the current $I_c$, in the additional excitation winding shown in FIG. 10 must be increased relative to the main excitation current for good commutation of the rotor currents. This process is progressive as the number of turns is increased. Furthermore, the significance of the net single crossing from one end ring to the other also becomes less as the number of turns is increased, and it may be omitted if desired, resulting in a type of rotor winding group shown in FIG. 11. With this type of winding group the main excitation may be reduced substantially to zero. A suitable excitation winding which could be used in conjunction with the rotor winding group shown in FIG. 11 is shown in FIG. 12 in which it will be seen that the excitation winding is now limited to small spaced-apart arcs, the arcs being in the region where current reversal is required in the rotor coils.

As so far described the machine has been regarded as made up of commutation sectors B alternating with active sectors A. Alternatively, instead of attempting rapid commutation over a short region B, progressive commutation can be employed by distributing the excitation winding according to an approximate sine curve as is commonly done in single-phase AC induction motors (see FIG. 13 which corresponds with FIG. 1). If then the output windings are similarly distributed, the argument as so far employed will show that under short circuit conditions the slot currents in the output windings will again need to match approximately the excitation currents in the slots and extension to polyphase machines can follow as before. The rotor windings of FIGS. 5, 7 and 8 can also be employed in such machines.

FIG. 14 shows a prime mover 20 driving an alternator 21 supplied with excitation current, $I_e$, and having polyphase outputs connected to a rectifier 22 which supplies DC to a load R. The alternator 21 represents any of the embodiments of the inductor alternator described herein. If the prime mover 20 runs at constant speed and the load resistance R is varied it is found that the relationship between DC voltage and DC current is as shown in FIG. 15, and is substantially a straight line joining the open circuit voltage to the short circuit current. Both $v_{oc}$ and $I_{sc}$ (see FIG. 15) are proportional to the excitation current so that if this is increased the characteristic moves parallel to itself as shown by the dotted line in FIG. 15. This characteristic is similar in shape to that obtained with a separately excited DC generator, but in such machines the drop in voltage with increasing load current is due to the resistance drop in the armature, and if excessive losses are to be avoided the operating point under full load must be at a point such as A in FIG. 15.

In the case of the alternator-rectifier combination in FIG. 14, the reduction of output voltage with increasing load is due to a totally different physical mechanism and the loss of voltage as the load current increases does not correspond with a large increase in power loss in the machine. The most efficient operating point in the system in FIG. 14 is therefore much nearer a point such as B in FIG. 15 and it is in the region of the point B that the alternator produced a substantially square wave current. Square wave currents give the most efficient utilization of the rectifiers, particularly if they are of the semiconducting type and also correspond with efficient use of copper in the alternator windings. It will be seen, however, from FIG. 15 that if the system is running at a point such as B and the load suddenly becomes disconnected there will be a very large rise in output voltage to the value $v_{oc}$. Since this is a situation that could very easily arise in practice it would be necessary to install rectifiers that could withstand this high voltage and this would be very uneconomic. The purpose of the arrangement described below is to eliminate this sudden voltage rise if the load disconnects. This result is achieved by the arrangement of FIG. 16 in which a fraction $\beta$ of the DC load current is added to the steady excitation $I_e$. The characteristics of this system can be explained by reference to FIG. 17. The full line shows the characteristic of the original system, assumed operating at the point B with load current $I_L$ and output voltage $V_L$. Since $v_{oc}$ is proportional to $I_e$, it may be written $v_{oc} = k I_e$. In the new system $I_e$ is replaced by $I_e + \beta I_L$ so that the new value of $v_{oc}$, $v_{oc}'$ is $$v_{oc}' = i\,(I_e + \beta I_L) \qquad (1)$$

and the new characteristic is shown by the dotted line in FIG. 17. Where $$v_{oc}' - v_{oc} = k\beta I_L = \frac{\beta I_L}{I_e} v_{oc} \qquad (2)$$

the new value of $v_L$ is therefore from the figure $$v_L' = v_L + \beta \frac{I_L}{I_e} v_{oc} \qquad (3)$$

where also from the figure $$v_L = v_{oc}\left(1 - \frac{I_L}{I_{sc}}\right) \qquad (4)$$

Hence $$v_L' = v_{oc}\left(1 - \frac{I_L}{I_{sc}} + \beta \frac{I_L}{I_e}\right) = v_{oc}\left(1 - \frac{I_L}{I_{sc}}\left(1 - \beta \frac{I_{sc}}{I_e}\right)\right) \qquad (5)$$

It follows from this equation that if $$\beta = I_e/I_{sc} \qquad (6)$$

$v_L'$ is equal to $v_{oc}$ independent of the load, so that sudden interruption of the load produces no voltage rise.

Under these circumstances the system characteristic is as shown in FIG. 18, the output voltage being entirely independent of load current. Thus if the system were suddenly short circuited, which is another practical possibility, infinite current would flow and the rectifiers would again be quickly destroyed. Thus protection against over voltage has been bought at the cost of danger from excess currents. It is a property of semiconductor rectifiers that they will break down substantially instantaneously an overvoltage but are only damaged by excess current when that current has been flowing for a sufficient time to heat up the rectifiers. Thus high-speed protective equipment can protect against excess current much more easily than against excess voltage. Furthermore, it may be seen from equation (5) that if $\beta$ is made slightly less than the value corresponding with equation (6) a characteristic as shown dotted in FIG. 18 can be obtained, and if in this Figure $v_L$ and $I_L$ represent full load operation then a system is obtained in which, for example, 10 percent overvoltage on open circuit can be combined with 10 times full load current on short circuit. With such an arrangement the voltage rating of the rectifiers need not exceed 110 percent of full load voltage and protective gear can be installed which will operated sufficiently quickly to prevent the limited short circuit current from destroying the rectifiers.

The system may also be used with advantage where the polyphase output is primarily used to supply AC loads provided a rectified current proportional to the AC load currents is derived from them by rectification.

The machine illustrated diagrammatically in FIGS. 19, 20 and 21 corresponds to the machine described in connection with FIG. 11 and FIG. 12 but in opened-out view, and corresponding parts of the machine are in line with each other in each of FIGS. 19, 20 and 21. The stator has two windings, namely an excitation winding and a polyphase output winding. The excitation winding is limited to arcs B and B', diametrically opposed to each other and each occupy the peripheral span of one rotor coil group. This winding is DC energized and generates a magnetic field whose axis is at right angles to the diametral line joining the centers of arcs B and B'. The remainder of the stator comprising arcs A and A' contains the polyphase output windings. The rotor member carries six short-circuited coils 21, each having six sides and wound in the manner shown, distributed around the periphery of the rotor. With such an arrangement an alternating current is generated in the stator output windings and since there are six groups of short-circuited coils on the rotor the fundamental frequency of the output current will be equivalent to that produced by a conventional 12-pole alternator.

The performance of the machine illustrated in FIG. 19 is improved by adding an additional winding in the form of a shorting grid over the arcs B and B' in which the excitation winding is contained. A convenient construction for such a shorting grid, comprises series of conductor bars 22 extending the length of the stator and connected between end rings 23 and 24 as shown in FIG. 20. It will be seen that the additional windings are similar to arcs of a squirrel cage winding. The conductor bars 20 are preferably made of low-resistance material and the currents that flow in this winding are such as to enable the ampere-conductors on both members of the machine to balance resulting in a better flux density distribution around the machine. The shorting grid has its greatest effect over the arcs B and B', but need not necessarily be limited to these regions. Conductive sheets may be used instead of the shorting grids. Such an arrangement results in low flux densities over the arcs B and B' but the currents induced in the shorting grid lead to heating over this region, which may therefore tend to reduce the output for a given frame size.

A further improvement in the performance of the machine is provided by increasing the size of the airgap over the arcs B and B' in which the excitation winding is provided. Such a varying airgap is shown diagrammatically in FIG. 21. It will be seen that the arcs B and B' are respectively divided into two sections, arc B being divided into sections C and D and arc B' being divided into sections C' and D'.

The airgap over the sections C and C' is of magnitude $g2$ say, while the airgap over the sections D and D' is $g3$. The airgap over the remaining portions of the machine where the output windings are provided have a magnitude $g1$. $g2$ is greater than $g3$ which in turn is greater than $g1$. Conveniently the gap $g2$ is formed by the removal of several stator teeth.

Such an arrangement enables larger cross section conductors to be used for the excitation winding therefore reducing the heat produced over the excitation sectors B and B' without reducing the power output of the machine.

We claim:

1. An inductor alternator comprising:
   a rotatable nonsalient pole rotor member carrying a short-circuited winding for generating a multipole magnetic field as a result of circulating currents within said short-circuited winding,
   a stator member disposed adjacent said rotor member and defining a circumferential airgap therebetween,
   said stator member having at least first and second predetermined positions spaced apart around said circumferential airgap,
   a DC excitation winding disposed within said stator member,
   said excitation winding having at least first and second sections respectively associated with said first and second positions such that, when energized with direct current of appropriate polarity, circulating currents produced in elements of said short-circuited rotor winding are caused to reverse in direction upon passing said predetermined positions thereby changing the magnetic polarity of portions of the rotor member directly associated with said element, and
   an AC output winding also disposed on said stator member between said first and second predetermined positions for energization with alternating current by said multipole field moving with said rotor member.

2. An inductor alternator as in claim 1 wherein the rotor winding comprises groups of conductor bars connected together in series and short-circuiting connections for said groups of conductor bars.

3. The alternator as claimed in claim 1 in which the rotor winding comprises a plurality of conductor bars spaced apart round the periphery of the rotor.

4. The alternator as claimed in claim 3 in which the ends of each bar are connected to short-circuited end rings.

5. The alternator as claimed in claim 1 in which the excitation winding is such that the distribution of conductive material around the circumference of the stator varies sinusoidally.

6. The alternator as claimed in claim 2 in which the short-circuiting connections of the rotor winding comprise end rings to which the series connected groups of conductor bars are connected.

7. The alternator as claimed in claim 2 in which the short-circuiting connections of the rotor windings are such that the series-connected groups of conductor bars each form separate short-circuited coils.

8. The alternator as claimed in claim 7 in which the DC excitation winding is limited to the region of said spaced-apart positions at which current reversal in the rotor windings takes place.

9. The alternator as claimed in claim 8 in which the stator is provided with additional windings in the form of short-circuited connections over the region of said current reversal positions.

10. The alternator as claimed in claim 9 in which the said additional windings comprise gridlike structures.

11. The alternator as claimed in claim 9 in which the airgap between the rotor member and the stator member is made larger over the region of said positions than elsewhere.